United States Patent
Rossmann

(10) Patent No.: US 6,952,220 B1
(45) Date of Patent: *Oct. 4, 2005

(54) METHOD OF DISPLAYING ELEMENTS HAVING A WIDTH GREATER THAN A SCREEN DISPLAY WIDTH

(75) Inventor: Alain Rossmann, Palo Alto, CA (US)

(73) Assignee: Openwave Systems Inc., Redwood City, CA (US)

(*) Notice: Subject to any disclaimer, the term of this patent is extended or adjusted under 35 U.S.C. 154(b) by 108 days.

This patent is subject to a terminal disclaimer.

(21) Appl. No.: 09/634,125

(22) Filed: Aug. 8, 2000

Related U.S. Application Data

(63) Continuation of application No. 08/815,646, filed on Mar. 13, 1997, now Pat. No. 6,147,670.

(51) Int. Cl.⁷ .............................................. G09G 5/34
(52) U.S. Cl. ..................................................... 345/684
(58) Field of Search ................................ 345/123, 124, 345/125, 684, 685, 682, 687, 169, 785, 786, 787

(56) References Cited

U.S. PATENT DOCUMENTS

| | | | |
|---|---|---|---|
| 4,309,700 A | | 1/1982 | Kraemer |
| 4,377,852 A | | 3/1983 | Thompson |
| 4,412,294 A | | 10/1983 | Watts et al. |
| 4,642,789 A | | 2/1987 | Lavelle |
| 4,814,757 A | | 3/1989 | Patterson et al. |
| 4,873,514 A | | 10/1989 | Nakagawa et al. |
| 4,952,927 A | | 8/1990 | DeLuca et al. |
| 5,111,426 A | * | 5/1992 | Bergstresser, Sr. et al. |
| 5,175,813 A | | 12/1992 | Golding et al. |
| 5,187,480 A | | 2/1993 | Thomas et al. |

(Continued)

FOREIGN PATENT DOCUMENTS

| | | |
|---|---|---|
| EP | 0 275 165 | 7/1988 |
| EP | 0864963 | 9/1997 |
| JP | 59 057338 | 4/1984 |
| WO | WO 89/01211 | 2/1989 |
| WO | WO 96/27968 | 9/1996 |
| WO | WO 97/31361 | 8/1997 |

OTHER PUBLICATIONS

"UP.Browser™ User Handbook", Unwired Planet, Inc., Nov., 1997.

"Method for Defining Pane Attributes for Scrolling" Research disclosure, No. 288, Apr. 1, 1988, p. 192 XP000052212.

Robert Coward, "Mastering Windows 3.1", Special Edition, pp. 409–441, 108, 1993.

*Primary Examiner*—Chanh Nguyen
(74) *Attorney, Agent, or Firm*—Beyer Weaver & Thomas, LLP

(57) ABSTRACT

A structured screen display process presents structured information that includes a plurality of elements on any width screen display so that the user is able to see as many of the elements as possible at once, and is able to see the complete text of any element as needed. The process dynamically adapts the display of structured information to the screen display width of the device. Further, in this dynamic adaptation, the user sees at a glance as many as possible of the elements of the structure, and the user can see any of the elements at the user's discretion in a way which is compatible with using structured information such as a menu of choices. The structured information is presented on a screen display by displaying at least a portion of each element in a plurality of elements on the screen display where at least one of the elements has a width greater than a width of the screen display. The at least one element is scrolled horizontally while continuing to display the portion of each other element in the plurality of elements.

23 Claims, 6 Drawing Sheets

U.S. PATENT DOCUMENTS

| | | | |
|---|---|---|---|
| 5,196,838 | A | 3/1993 | Meier et al. |
| 5,243,331 | A | 9/1993 | McCausland et al. |
| 5,321,750 | A | 6/1994 | Nadan |
| 5,321,804 | A | 6/1994 | Kusaba et al. |
| 5,384,579 | A | 1/1995 | Nakasuji et al. |
| 5,446,882 | A | 8/1995 | Capps et al. |
| 5,528,260 | A | 6/1996 | Kent |
| 5,586,196 | A | 12/1996 | Sussman |
| 5,594,897 | A | 1/1997 | Goffman |
| 5,677,708 | A | 10/1997 | Matthews, III et al. |
| 5,745,716 | A | 4/1998 | Tchao et al. |
| 5,749,082 | A | 5/1998 | Sasaki |
| 5,801,677 | A * | 9/1998 | Obata ......................... 345/1.1 |
| 5,809,415 | A | 9/1998 | Rossmann |
| 5,818,437 | A | 10/1998 | Grover et al. |
| 5,819,286 | A | 10/1998 | Yang et al. |
| 5,825,349 | A | 10/1998 | Meier et al. |
| 5,844,561 | A | 12/1998 | Tanimoto et al. |
| 5,867,158 | A | 2/1999 | Murasaki et al. |
| 5,874,936 | A | 2/1999 | Berstis et al. |
| 5,883,635 | A | 3/1999 | Rao et al. |
| 5,911,485 | A | 6/1999 | Rossmann |
| 6,016,142 | A | 1/2000 | Chang et al. |
| 6,018,577 | A | 1/2000 | Roach, Jr. |
| 6,073,036 | A | 6/2000 | Heikkinen et al. |
| 6,150,962 | A | 11/2000 | Rossmann |
| 6,170,000 | B1 | 1/2001 | Bories et al. |
| 6,209,009 | B1 | 3/2001 | Schwartz et al. |
| 6,288,718 | B1 | 9/2001 | Laursen et al. |
| 6,292,176 | B1 * | 9/2001 | Reber et al. ................ 345/169 |
| 6,307,549 | B1 | 10/2001 | King et al. |
| 6,370,518 | B1 | 4/2002 | Payne et al. |

* cited by examiner

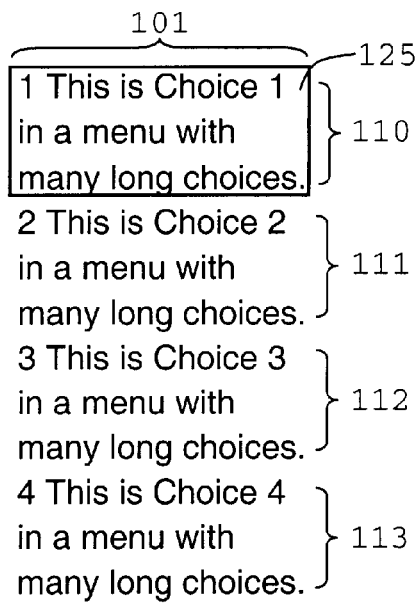
*Fig. 1A (Prior Art)*
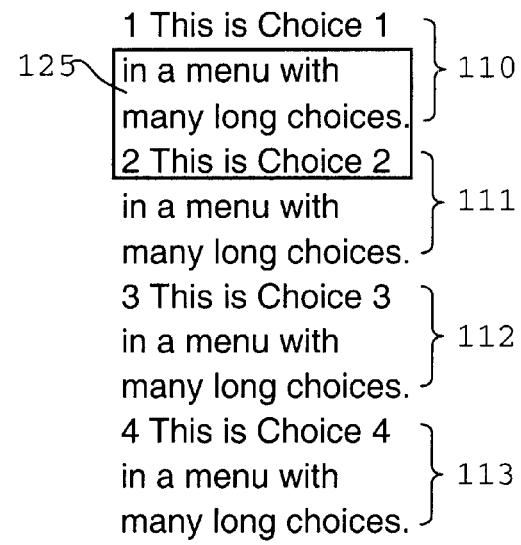
*Fig. 1B (Prior Art)*
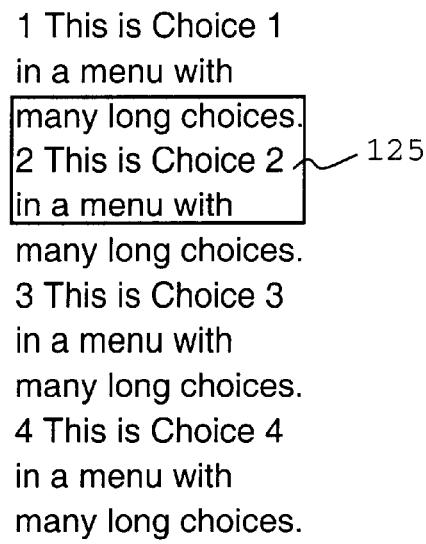
*Fig. 1C (Prior Art)*
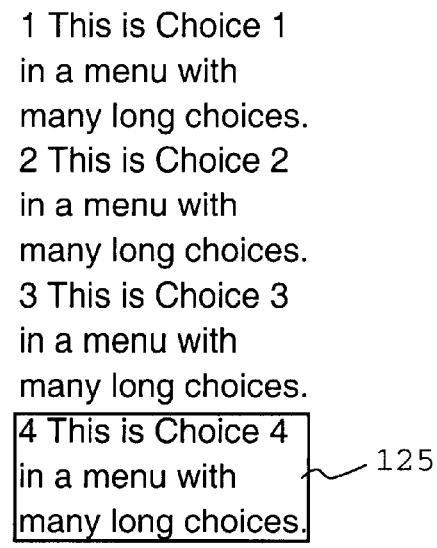
*Fig. 1D (Prior Art)*
1 Choice 1, This a menu with many long choices ... 4 Choice 4, This a menu with many long choices.
*Fig. 2 (Prior Art)*

| | |
|---|---|
| 1. > in a menu with | |
| 2. This is Choice 2 | |
| 3. This is Choice 3 | |
| 4. This is Choice 4 | |

| |
|---|
| 1. > many long choices |
| 2. This is Choice 2 |
| 3. This is Choice 3 |
| 4. This is Choice 4 |

| |
|---|
| 1. > This is Choice 1 |
| 2. This is Choice 2 |
| 3. This is Choice 3 |
| 4. This is Choice 4 |

METHOD OF DISPLAYING ELEMENTS HAVING A WIDTH GREATER THAN A SCREEN DISPLAY WIDTH

CROSS-REFERENCE TO RELATED APPLICATION

The application is a continuation of prior U.S. patent application No. 08/815,646, filed Mar. 13, 1997, now U.S. Pat. No. 6,147,670, which is hereby incorporated by reference herein.

BACKGROUND OF THE INVENTION

1. Field of the Invention

This invention relates generally to the display of information on small display screens, and in particular to methods for displaying information having a width greater than the screen display width.

2. Description of Related Art

Next generation pocket size devices such as cellular telephones and pagers as well as desk-top telephones are now capable of receiving and displaying structured textual information which originated outside of the device. However, these devices usually have display screens with varying screen sizes and consequently varying screen display widths. Thus, the author of the structured textual information cannot customize the layout of the information for the screen size of a specific device because the screen size is device dependent.

In view of the variations in screen size among devices, prior art solutions for displaying structured information have attempted to dynamically adapt to the information being received and to display the information in a way which is best suited to making the information usable to the user. Ideally, the user would be able to see as many of the structure elements as possible at once, and would be able to see the complete text of any element when needed.

Currently, there are three alternative solutions to the problem of displaying text which exceeds the width of a small screen display such as those on cellular telephones, or pagers. As explained more completely below, none of the current display methods solves the problem of having the device dynamically adapt to the size of the elements being displayed. Further, the current methods make compromises with respect to allowing the user to see as many of the elements as possible at once, and to see the complete text of any element when needed.

In a first method, if the text of an element 110 is longer than screen display width 101, the text is wrapped and made to flow down the display screen as illustrated in FIG. 1A. In FIGS. 1A to 1D, the rectangle defined by the solid lines represents the display screen. The other elements in the structured textual information are shown simply to provide context for the following description.

In this method, the elements which do not fit on screen display 125, e.g., choices 111 to 113, are clipped and can be accessed by scrolling down vertically. This is similar to the method used by computer word processors for example. The fact that the text is structured into four elements 110 to 113 is not considered in displaying the text. Elements 110 to 113 are considered one continuous text message.

The vertical scrolling can be one line at a time, one screen display at a time (See the discussion of FIGS. 3A to 3D), or a faction of a screen display at a time. In this example, one line is scrolled at a time and so after a scroll, screen display 125 is as shown in FIG. 1B. The user sees a portion of element 110 and a portion of element 111.

As illustrated in FIGS. 1A to 1D, at any instant, the user is not able to view even a portion of all four of the choices in the list on screen display 125. In this embodiment, with a four line screen display, the user can view at most one complete choice. The user must scroll vertically to see the other choices. This makes it very hard for the user to remember what the choices are as the user has to remember prior choices while scrolling to see other choices.

A second display method has been to display a message with multiple lines as a single line and automatically scroll the multiple lines horizontally across the screen display. This is similar to the way one line of information is displayed for example on Times Square in New York.

The second method, where the text is fit on one line and scrolled horizontally, would not be applicable to our example. Scrolling the concatenated text of the four choices on one line, as illustrated in FIG. 2, would make the system unusable for the user.

A last display method used is a hybrid of the two methods described above. Text is wrapped on the screen display and after a short pause, long enough for the text to be read, the text automatically scrolls vertically, usually a full screen display at a time. This display method is illustrated in FIGS. 3A to 3D where each element is displayed individually in this example.

The last method has the same pitfalls as the first one by allowing the user to see only one choice at a time. The fact that the screen display scrolls automatically to the next screen display makes it harder for the user to remember the choices as the automatic scroll can occur before the user had time to understand the choices presented to him or her.

The three scrolling methods described above are well suited to the display of unstructured textual information such as a text message. They are often used in pagers or cellular telephones which support paging.

However, as illustrated above, the methods do not work well for structured elements, such as those in a list of user choices, a menu of user options, or a list of data that are presented on a display screen which is too small to display all of the structured elements in their entirety. In each of the methods, although structured information was considered, the method simply processed the structured information as one continuous string of text without regard to the elements within the structure.

Presenting a structured list on a small display screen presents many unresolved challenges. The reason this problem has not been solved is that up to now devices with a small display such as pagers or cellular telephones either displayed information which had been preprogrammed into the device, or displayed non-structured textual information.

In the case of information which had been preprogrammed into the device, such as a menu of choices pertaining to the configuration of the device, the engineers who programmed these menus made sure that the information had been optimized to the device and chose the wording to make sure that the choices fit within the width of the screen display.

When information originates outside of the device, only the case of non-structured information has been implemented and the methods described above are used with good results. When structured information originates outside of the device and is meant to be displayed on devices with various display screen sizes, there is no way to layout, i.e., preprogram, the information for a particular screen display size. Thus, a solution of the problems associated with displaying structured information on small display screens is needed before structured information, such as a menu of choices, can be advantageously used on telephones, cellular telephones, pagers and other devices with small display screens.

SUMMARY OF THE INVENTION

According to the principles of this invention, a structured screen display process presents structured information that includes a plurality of elements on any width screen display so that the user is able to see as many of the elements as possible at once, and is able to see the complete text of any element as needed. The process of this invention dynamically adapts the display of structured information to the screen display width of the device. Further, in this dynamic adaptation, the user sees at a glance as many as possible of the elements of the structure, and the user can see any of the elements at the user's discretion in a way which is compatible with using structured information such as a menu of choices.

In one embodiment of the method of this invention, structured information is presented on a screen display by displaying at least a portion of each element in a plurality of elements on the screen display where at least one of the elements has a width greater than a width of the screen display. The at least one element is scrolled in a predefined direction, e.g., horizontally, while continuing to display the portion of each other element in the plurality of elements.

BRIEF DESCRIPTION OF THE DRAWINGS

FIGS. 1A to 1D illustrate a first prior art solution for displaying structured information on a small display screen.

FIG. 2 illustrates a second prior art solution for displaying structured information on a small display screen.

DETAILED DESCRIPTION

According to the principles of this invention, a structured screen display method displays as many of the elements in a structured screen display as possible at once, and allows the user to see any element completely when needed. Herein, a structured screen display is composed of individually identifiable elements. For example, a menu of choices constitutes a structured screen display where the elements are the individual choices.

Using the same example of a menu with four choices as above, according to the principles of this invention, each element 410 to 413 is displayed on one line of screen display 425. On displays with a limited number of lines, one line for each element is the most often chosen implementation. However, the use of one line for each element is only illustrative of the principles of this invention and is not intended to limit the invention to this particular embodiment. Alternatively, each element could be displayed on two or more lines without affecting the principles of this invention.

Figure 3A:
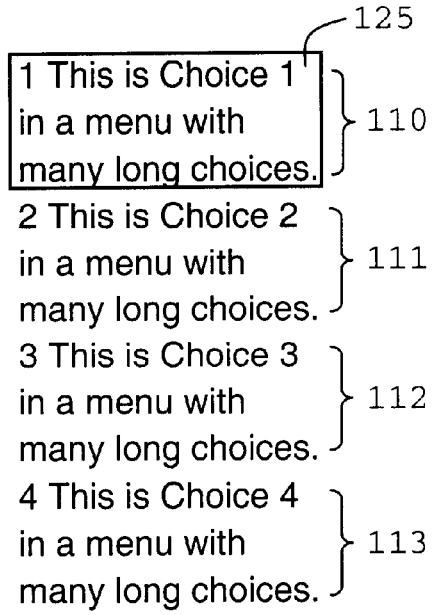
FIGS. 3A to 3D illustrate a third prior art solution for displaying structured information on a small display screen.
Figure 3B:
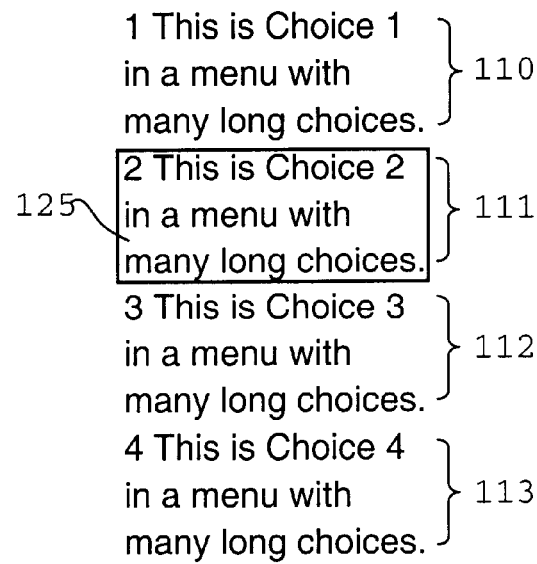
Figure 3C:
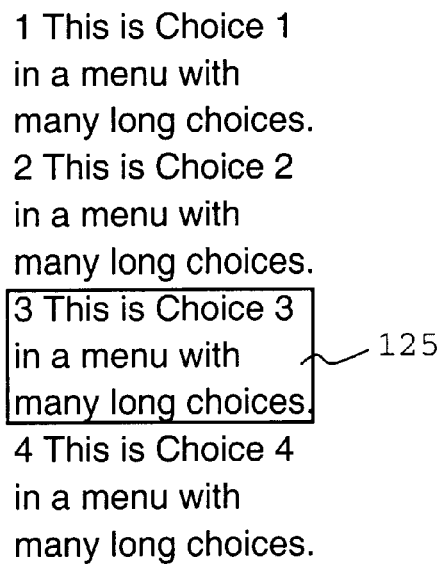
Figure 3D:
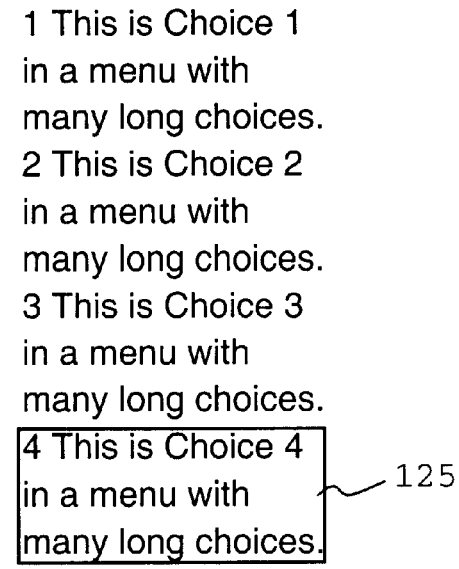
Figures 4A, 4B, 4C, 4D:
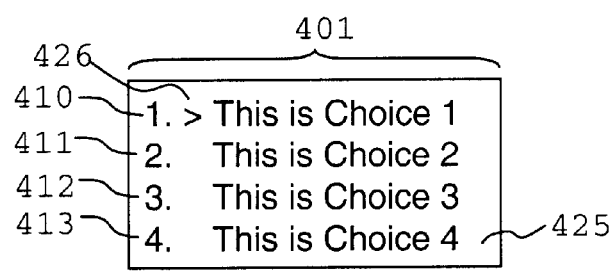
FIGS. 4A to 4D illustrate the screen displays for structured information according to the principles of this invention where structured information is displayed on a display screen so that the user is able to see as many of the structure elements as possible at once and is able to see the complete text of any element when needed.

Since the length of each of elements 410 to 413 exceeds width 401 of screen display 425, the display of each element is clipped and only as many characters of each element as fit width 401 of screen display 425 are visible in FIG. 4A. In this embodiment, the element is wrapped at a word boundary, i.e., a subelement boundary, so that partial words are not displayed.

According to the principles of this invention, one element 410 of displayed elements 410 to 413 is selected as indicated by element selection character 426. An important aspect of the invention is that only one element can be selected at a time.

In this embodiment, the specific element selected is visually indicated to the user by element selection character 426 that is placed after the label for that element. However, any other method ,such as inverse video, a different element selection character, or the position of the element being always at the top or bottom of the display, could be used to indicate the specific element selected without having an impact on the operation of this invention.

The user can select a different element by vertically scrolling element selection character 426 up or down. The specific method used to move element selection character 426 up or down on screen display 425 is not an essential feature of this invention. In view of this disclosure, those of skill in the art can implement the invention with any desired mechanism for moving element selection character 426. For example, a thumb wheel, a mouse, or a rocking controller, as available in some video games, would work equally well as mechanisms for scrolling element selection character 426.

Independent of the method used to move element selection character 426, when a specific element is selected, the information in the selected element is automatically scroll horizontally in a predefined manner. In this implementation, as illustrated in FIGS. 4B and 4C, selected element 410 scrolls one screen display width at a time aligned on word boundaries after a pause that is long enough for the user to read the newly visible text. Herein, aligned on word boundaries means that after a horizontal scroll, the leftmost visible word of the scrolled element is the first word which was not visible before the scroll.

In this embodiment, selected element 410 keeps scrolling after each pause until the complete element has been displayed to the user. In one implementation, the method scrolls through the entire element three times to make sure the user has ample time to read the selected element.

In the case of a menu of choices with each choice labeled with a number for example, neither the label nor element selection character 426 scroll. This helps the user preserve context, and link the newly visible text as belonging to the selected and now scrolling choice. However, even without preserving the context of a particular choice, the novel principles of this invention are a significant enhancement over the prior art method that treated the screen display as a single continuous text message.

In this embodiment, when structured information is first displayed on screen display 425, first element 410 of the structured information is selected and starts horizontal scrolling automatically. The system could optionally only trigger horizontal scrolling upon the user changing the selection without affecting this invention.

The exact timing and speed of the horizontal scrolling of an element also does not affect this invention. The actual choice is a matter of preference and can be optimized to increase user comfort. The number of times the process scrolls the complete element can be changed to any number of repetitions without affecting the operation of this invention.

It is important to note that because structured information is being displayed, and because this invention makes use of the concept of a selected element within the structured information, it is the user's action of scrolling to an element and selecting the element which triggers the horizontal scrolling. This is an essential difference with the prior art scrolling methods described above which assumed that the displayed text had no structure.

In one embodiment of this invention, the structured screen display method is included in a plurality of methods that are executed on a processor within a portable hand-held device. The other methods performed are not essential to this invention and so are not considered further. In view of the following disclosure, one of skill in the art can integrate the structured screen display method of this invention into the device so that the method is performed at the appropriate time. For example, the method of this invention could be implemented with the client module described in and commonly assigned U.S. patent application No. 08/570,210 entitled "METHOD AND ARCHITECTURE FOR AN INTERACTIVE TWO-WAY DATA COMMUNICATION NETWORK" of Alain Rossmann, of which the detailed description and appendices are incorporated herein by reference in their entireties. The client module included a plurality of manager modules including a navigation manager module, a network manager module, a TIL manager module, an archive manager module, a local manager module, an event manager module, a timer manager module, a user interface manager module, a memory manager module, and a device dependent module.

In this embodiment, two events can initiate structured screen display method 500 of this invention. A first event is display of a new screen, and a second event is activation of an element selection character key by the user.

Herein, it is assumed that if the element selection character key is simply depressed and released, the user wants to horizontally scroll the element currently selected as indicated by element selection character 426. However, if the user holds the element selection character key depressed, the screen display is scrolled from element to element until the user releases the element selection character key to select a particular element.

The event generated by release of the element selection character key includes identification of the particular element selected for horizontal scrolling by the user. Of course, if the number of elements in the structured screen display is greater than the number of elements that can be displayed at one time on screen display 425, as element selection character 426 is moved to elements that are not displayed, the screen display is vertically scrolled to show the element on which element selection character 426 is currently located. Vertical scrolling of information on a screen display to maintain display of a pointer is well-known to those of skill in the art and so does not form an essential aspect of this invention.

Figure 5A:
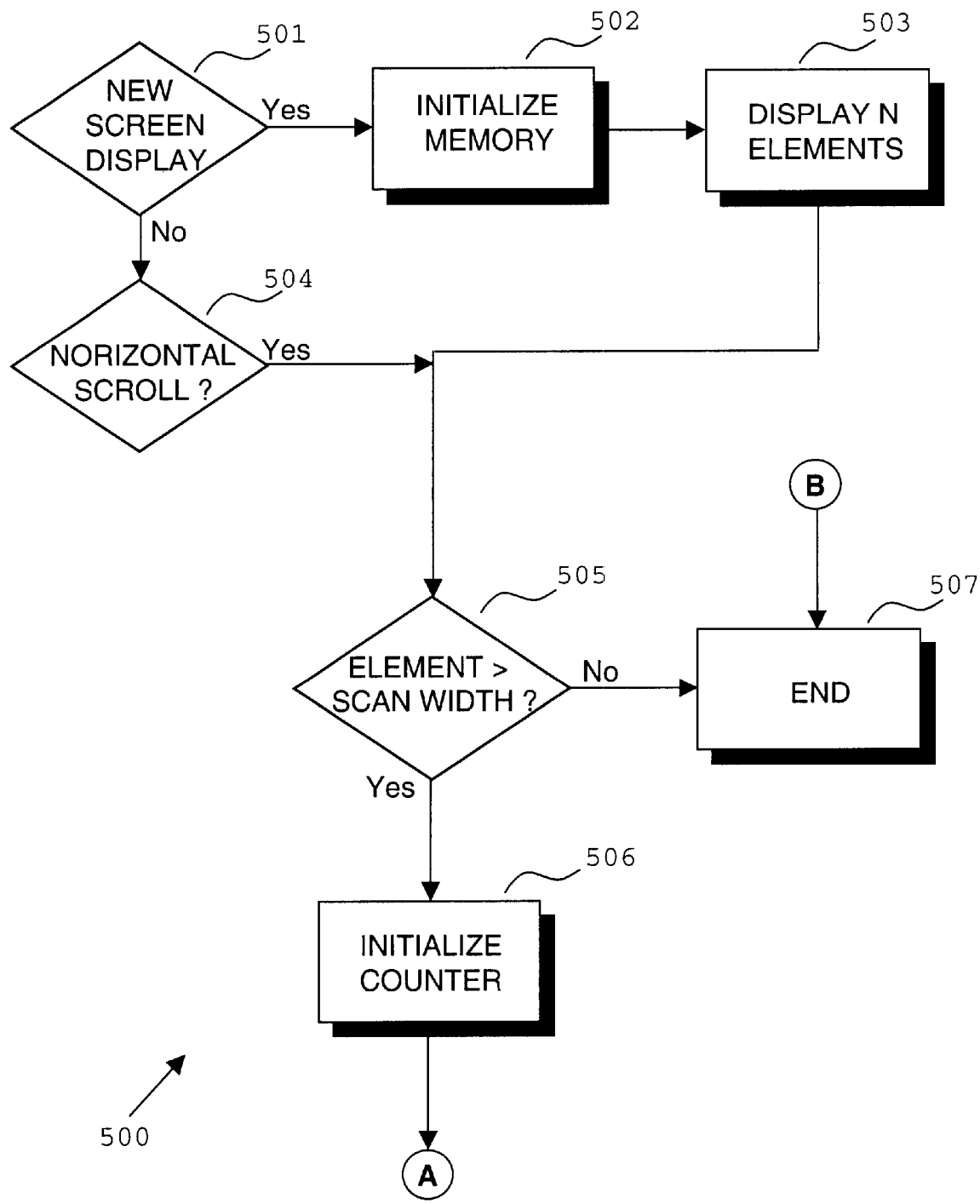
FIGS. 5A and 5B are a process flow diagram for one embodiment of the structured display process of this invention.
Figure 5B:
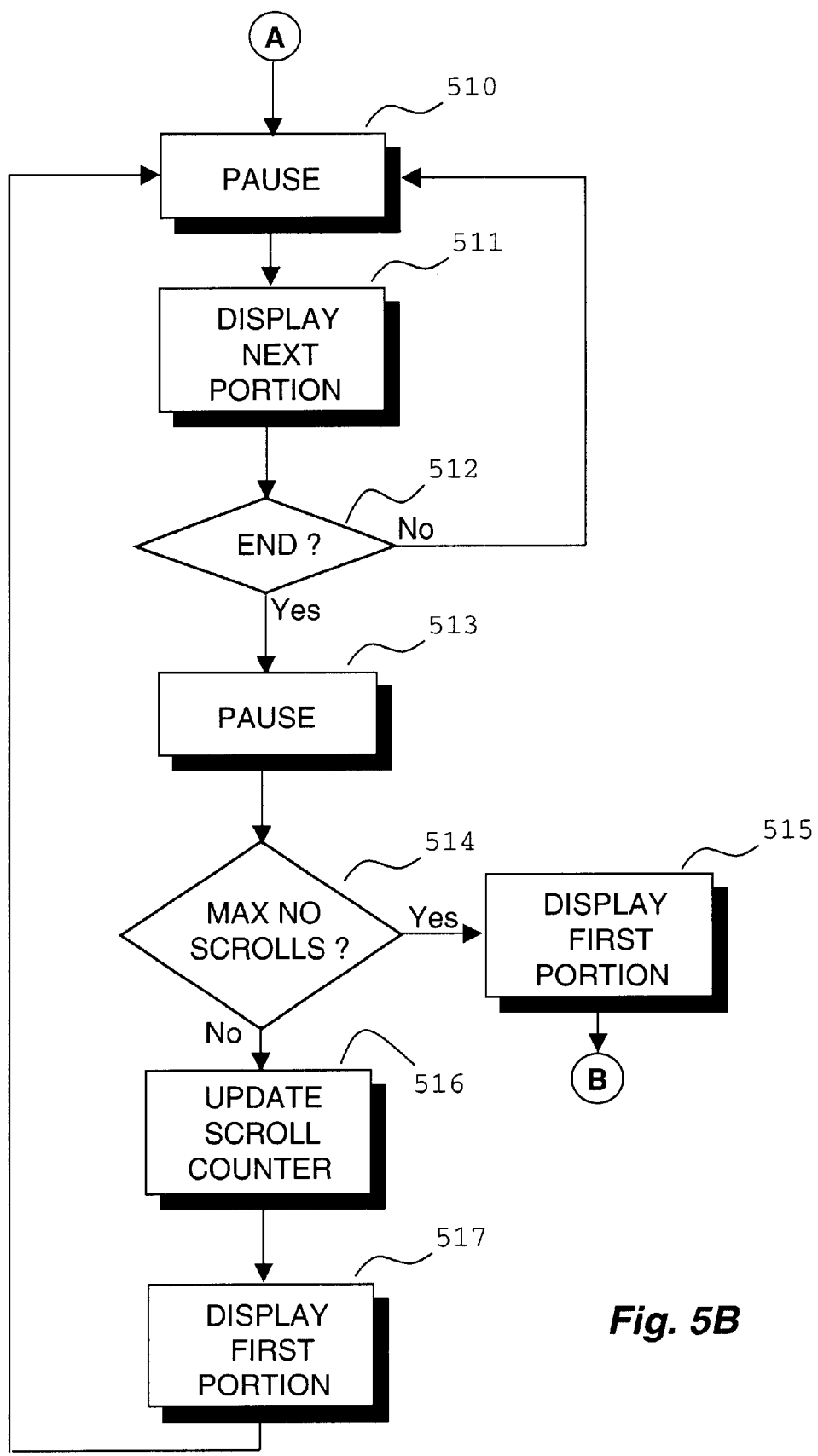

Hence, in structural display method 500 (FIGS. 5A and 5B), a structured screen display event handler within an event manager first checks in new screen display event check 501 whether the current event is a new screen display. If the current event is a new screen display, check 501 transfers processing to initialize memory operation 502.

In one embodiment of initialize memory operation 502, each storage location in a screen display buffer memory 625 is set to a predefined value, e.g., a negative number or perhaps, an illegal value, that is used to define the end of each element for the screen display. Alternatively, each element can include an end-of-element character to indicate the end of the element. In either case, the elements for the screen display are stored in screen display buffer memory 625 for subsequent display.

Figure 6:
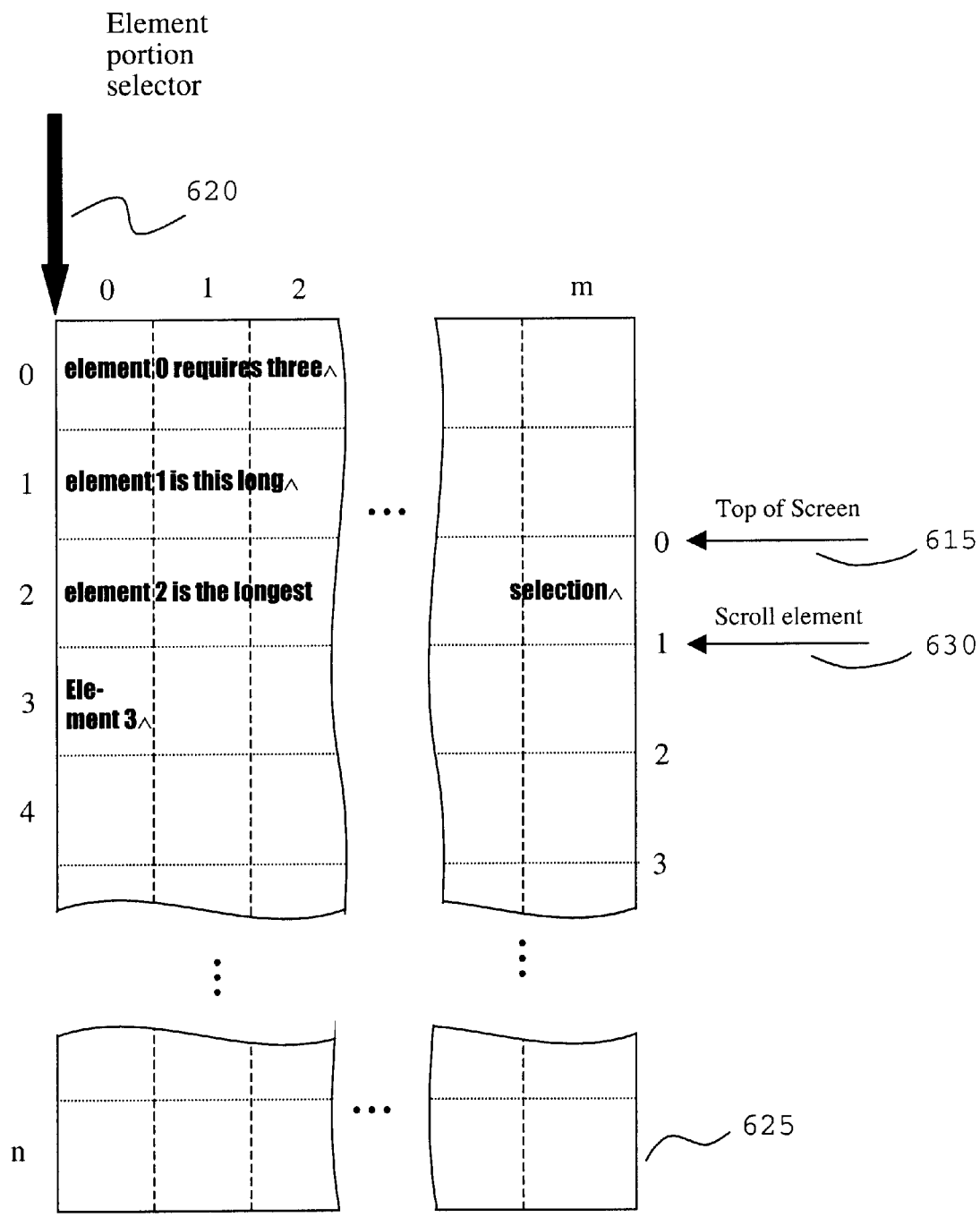
FIG. 6 illustrates one embodiment of the pointers and the relationship of the pointers to structured information stored in a buffer memory as used by the method of this invention.

In this example, a combination of a slash and a back slash are used as the end-of-element character. Also in FIG. 6, dashed vertical lines are superimposed on the memory to illustrate the screen display width. Thus, element 0 is stored as three subelements where each subelement is the information that can be displayed at one time on the display screen. The subelements with element 0, as represented in FIG. 6, are stored in locations (0,0), (0,1) and (0,2) of memory 625, where the first number in a pair represents the element, and the second number in the pair identifies the subelement of that element.

The concept of storing subelements is for illustration purposes only. Typically, an element is simply stored in contiguous memory locations. The important aspects are that a word or other part of an element is not broken across two screen displays, and a mechanism is provided to horizontally scroll an element. The use of subelements is intended only to assist in the visualization of this process. In this embodiment, an element portion selector is 620 used to identify the start of the next screen display within an element and the width of screen display 425 is known so that the appropriate portion of an element can be displayed during horizontal scrolling of that element.

Element 1 requires two screen display widths and is shown stored in memory 625 at locations (1,0) and (1,1). As illustrated in FIG. 6, each element can be up to m screen display widths wide where m is selected by the application programmer. Also, as illustrated in FIG. 6, buffer memory 625 is n elements deep.

A top of screen pointer 615 is used to indicate the element currently displayed in the top position on screen display 425. For the position of pointer 615 illustrated in FIG. 6, a four line screen, and one element per line, elements two through five are displayed on screen display 425 and character selector element 426 is positioned on element two as indicated by scroll element pointer 630 that corresponds to the position of character selector element 426 on screen display 425.

In initialize memory operation 502, top of screen pointer 615 is initialized to point to element zero, and character selection element 426 is initialized to element zero by setting scroll element pointer 630 to zero. In operation 502, element portion selector 620 is also set to point at the start of element zero. Thus, operation 502 not only stores the structured information that is displayed but also initializes pointers associated with scrolling and positioning of information on screen display 425.

Storage of elements in contiguous locations of buffer memory 625, as illustrated in FIG. 6, is only for ease of illustration of the principles of this is invention. The particular technique used to store the elements, that are displayed on screen display 425, is not an essential aspect of this invention.

After the elements are stored in memory 625 and the various pointer initialized in operation 502, the first N elements are displayed in display N elements operation 503. In this embodiment, N is an integer that is defined as:

N=(Number of Screen lines)/(Lines per element).

If any of the first N elements has a width greater than screen display width 401, only a first portion of the element is displayed, e.g. for text, a first t characters or less where t is the maximum number of characters that can be displayed on a line. In this embodiment, a word is not split. Display first N elements operation 503 transfers to element greater than screen display width check operation 505.

If the event that initiates method 500 is activation of element selection character key, horizontal scroll check 504 transfers processing to element greater than screen display width check operation 505 along with a value of scroll element pointer 630.

In this embodiment, as described above, scroll element pointer 630 indicates the position of character selection element 426 on screen display 425 and top of screen pointer 615 identifies the storage location in memory 625 of the first element displayed. Thus, the element that is considered for horizontal scrolling is the located in memory 625 at the sum of top of screen pointer 615 and scroll element pointer 630.

In element greater than screen display width 505, the first portion of the first element, which in this example is the portion stored at position (0,0) in FIG. 6, is tested to determine whether the end-of-element character is included in the first portion. If the end-of-element character is not included in the first portion, the first element, e.g., element zero, displayed on screen display 425 has a width greater than screen display width 401, and so check 505 sets element portion selector 620 to point at the start of a second portion of the element. Check 505 transfers processing to initialize counter operation 506.

Conversely, if the end-of-element character is included in the first portion, the first element, i.e., element zero, has a width less than screen display width 401 and so no horizontal scrolling is required. In this case, check 505 transfers to end operation which performs any necessary clean-up and returns control to the event manager.

In this embodiment, an element is horizontally scrolled a predefined number of times. The predefined number of times is selected to facilitate the user seeing the entire element enough times that the user associates the information with the particular label for that element. In one embodiment the predetermined number of times is three. Thus, for this embodiment, initialize counter 506 sets a horizontal scroll counter to three and transfers processing to pause operation 510. Of course, if it is unnecessary to repeat the horizontal scrolling a predefined number of times operation 506 and maximum number of scrolls check 514, that is described more completely below, could be eliminated.

As indicated above, each portion of the selected element is displayed for a predefined time period that is long enough for the user to easily read the newly visible portion of the selected element. Thus, pause operation 510, and pause operation 513 that is described below, are simply time delays for the predefined period. In this embodiment, the time delay implemented in pause operations 510 and 513 is the same for each portion of the element. In each instance, pause operation 510 transfers processing to display next portion operation 511.

However, implementations that provide varying delays for horizontal scrolling through the portions of the selected element, or differing delays for different horizontal scrolls through an element are also within the scope of this invention. For example, a first pause flag could be set upon entry to method 500. In pause operation 510, when the pause flag is set, a longer pause is used for the first portion displayed to allow the user time to decide whether to select an element other than the first element displayed for horizontal scrolling. The first entry to pause operation 510 clears the pause flag. Also, the user may not require as much time to read the selected element on the final horizontal scroll of that element. Thus, pause operation 510 could use the value of the horizontal scroll counter to select a particular time delay.

Display next portion operation 511 displays the portion of the element starting at the location of element portion selector 620, and transfers to end-of-element check operation 512.

End-of-element check operation 512 tests the portion, that is stored at position (0,1) in FIG. 6, to determine whether the end-of-element character is included in the second portion of the element. If the end-of-element character is not included in the second portion, the first element displayed in screen display 425 has a width greater than twice the screen display width, and so check sets element portion selector 620 to point at the start of a third portion of the element. Check operation 512 transfers processing to pause operation 512 when the current displayed portion of the selected element is not the last portion of that element.

Conversely, if the end-of-element character is included in the second portion, the second portion has a width less than or equal to screen display width 401 and so the horizontal scroll of the selected element is complete. In this case, check 512 transfers to a second pause operation 513.

When processing returns to pause operation 510, the next portion of the element is displayed for the predefined time and then processing again transfers to display next portion operation 511. Display next portion operation 511 displays the next portion of the element as identified by element portion selector 620, and transfers to end-of-element check operation 512. Operations 510 to 512 are repeated until end-of-element check operation 512 detects the end-of-element character and transfers processing to pause operation 513.

Note that if for some reason, an element does not have an end-of-element character, at some point check 512 generates an address for element portion selector 620 that is out-of-bounds and an error occurs. Alternatively, the user can terminate the scrolling at any time by pressing a key of the hand-held device that changes the selected element. While it is not shown in FIG. 5, an event such as a key-press terminates method 500 and returns processing control to the event manager.

Upon entry to pause operation 513, the complete element has been displayed, but the last portion of the element was just displayed in operation 511. Consequently, pause operation 513 delays for a predefined time so that the user can comfortably read the last portion of the element, and then transfers processing to maximum number of scrolls check operation 514.

Maximum number of scrolls check operation 514 first sets element portion selector 620 to point at the start of the selected element. Check 514 tests the value of the horizontal scroll counter. If the value of the counter is not zero, in this embodiment, i.e., a second predefined value, the element has not been horizontally scrolled the maximum number of times, and processing transfers to update scroll counter operation 516. Conversely, if the value of the horizontal scroll counter is the second predefined value, the element has been scrolled the maximum number of times and processing transfers to update display operation 515. Update display operation 515 displays the portion of the element that is pointed to by element portion selector 620 and transfers processing to end operation 507, that was described above.

When the element has not been horizontally scrolled the predefined number of times, update scroll counter operation 516 changes the value of horizontal scroll counter to indicate that another horizontal scroll of the element has been completed. Update scroll counter operation 516 transfers processing to display operation 517. Display operation displays the first portion of the selected element and sets element portion selector 620 to point at the start of a second portion of the selected element and transfers processing to pause operation 510.

Operations 510 to 514 and 516, 517 are repeated until the element has been horizontally scrolled the maximum number of times. As indicated above, when this occurs check 514 transfers to display first portion operation 515 that in turn transfers to end operation 507.

Thus, according to the principles of this invention, structured information is displayed on a screen so that the user is able to see as many of the structure elements as possible at once, and is able to see the complete text of any element when needed. Consequently, structured information that is generated outside a device, such as telephones, pagers, cellular telephones and similar devices with a small screen, can be easily processed and displayed using the method of this invention. While one embodiment of this invention has been displayed, the embodiment is only illustrative of the principles of the invention and is not intended to limit the invention to the specific embodiment described.

I claim:

1. A method of displaying structured information on a screen comprising:

displaying at least a portion of each element of a plurality of elements included in structured information on a screen wherein at least one of said elements has a width greater than a width of said screen, and wherein said displayed portion of said at least one element is a first pre-determined portion of said element and includes a plurality of words;

receiving a selection that identifies said at least one element as a selected element;

automatically scrolling in a predefined direction said at least one selected element while continuing to display a portion of each other element of said plurality of elements;

wherein said automatic scrolling of said at least one selected element operates to automatically scroll said at least one element with respect to said screen so that as a result of said automatic scrolling said first pre-determined portion of said at least one selected element is no longer displayed on said screen and a second pre-determined portion of said at least one selected element is displayed on said screen.

2. A method of displaying structured information on a screen as in claim 1 wherein said automatically scrolling in a predefined direction further comprises:

displaying said first portion of said at least one element selected for a predefined time.

3. A method of displaying structured information on a screen as in claim 2 wherein said automatically scrolling in a predefined direction further comprises:

displaying said second portion of said at least one selected element for said predefined time.

4. A method of displaying structured information on a screen as in claim 3 wherein said automatically scrolling in a predefined direction further comprises:

testing to determine whether said at least one selected element includes only two portions.

5. A method of displaying structured information on a screen as in claim 1 further comprising:

repeating said automatically scrolling of said at least one selected element a predefined number of times.

6. A method of displaying structured information on a screen as in claim 1 wherein said predefined direction is horizontal.

7. A method of displaying structured information on a screen comprising:

determining whether a width of one element in a plurality of elements included in structured information on a screen is greater than a width of said screen, said one element including a first predetermined portion including a plurality of words which are displayed on said screen;

receiving a selection that identifies said one element as a selected element;

automatically horizontal scrolling said one selected element while continuing to display a portion of each other element of said plurality of elements upon receiving said selection; and wherein as a result of said automatic horizontal scrolling of said selected element a second predetermined portion of said one selected element is displayed on said screen instead of said first predetermined portion of said selected element.

8. A method of displaying structured information on a screen as in claim 7 further comprising:

displaying a portion of each other element in said plurality of elements on said screen while horizontally scrolling said one selected element.

9. A method of displaying structured information on a screen as in claim 7 further comprising:

repeating said horizontally scrolling of said selected one element a predefined number of times.

10. A method of displaying structured information on a screen as in claim 7 wherein said horizontally scrolling said one selected element further comprises:

displaying said first portion of said one element for a predefined time.

11. A method of displaying structured information on a screen as in claim 10 wherein said horizontally scrolling of said one selected element further comprises:

displaying said second portion of said at least one selected element for said predefined time.

12. A method of displaying structured information on a screen as in claim 11 wherein said horizontally scrolling said one selected element further comprises:

testing to determine whether said at least one selected element includes only two portions.

13. A method of displaying structured information on a screen as in claim 1 wherein said scrolling in a predefined direction further comprises:

displaying said first portion of said at least one selected element for a predefined time before automatically scrolling to a next portion, wherein said first portion includes at least one word of said at least one selected element, and wherein said next portion includes at least one word of said at least one element not within said first portion.

14. A method of displaying structured information on a screen as in claim 13 wherein none of said next portion is included in first portion.

15. A method of displaying structured information on a screen as in claim 14 wherein partial words are not displayed during said displaying or said scrolling.

16. A method of displaying structured information on a screen as in claim 13 wherein partial words are not displayed during said displaying or said scrolling.

17. A method of displaying structured information on a screen as in claim 1 wherein partial words are not displayed during said displaying or said scrolling.

18. A computer readable medium including at least computer program code for displaying structured information on a screen of a computing device, said computer readable medium comprising:

- computer program code for displaying at least a portion of each element of a plurality of elements included in structured information on a screen wherein at least one of said elements has a width greater than a width of said screen and wherein said displayed portion of said at least one element is a first pre-determined portion of said element and includes a plurality of words;
- computer code for receiving a selection that identifies said at least one element as a selected element;
- computer program code for automatically scrolling in a direction said at least one selected element while continuing to display a portion of each other element of said plurality of elements; and
- wherein said automatic scrolling of said at least one selected element operates to automatically scroll said at least one selected element with respect to said screen so that as a result of said automatic scrolling said first pre-determined portion of said at least one selected element is no longer displayed on said screen and a second pre-determined portion of said at least one selected element is displayed on said screen.

19. A computer readable medium as in claim 18,

- wherein said computer program code for scrolling in a predefined direction further comprises computer program code for displaying said first portion of said at least one selected element for a predefined time before automatically scrolling to a next portion,
- wherein said first portion includes at least one word of said at least one element, and
- wherein said next portion includes at least one word of said at least one element not within said first portion.

20. A computer readable medium as in claim 19 wherein none of said next portion is included in first portion.

21. A computer readable medium as in claim 20 wherein partial words are not displayed during said displaying or said scrolling.

22. A computer readable medium as in claim 19 wherein partial words are not displayed during said displaying or said scrolling.

23. A computer readable medium as in claim 18 wherein partial words are not displayed during said displaying or said scrolling.

\* \* \* \* \*